(12) United States Patent
More

(10) Patent No.: US 8,919,514 B2
(45) Date of Patent: Dec. 30, 2014

(54) FLOATING HOUSING FORCE TRANSMITTING ASSEMBLY

(75) Inventor: Shantaram Ashok More, Pune (IN)

(73) Assignee: Eaton Corporation, Cleveland, OH (US)

( * ) Notice: Subject to any disclaimer, the term of this patent is extended or adjusted under 35 U.S.C. 154(b) by 351 days.

(21) Appl. No.: 13/432,753

(22) Filed: Mar. 28, 2012

(65) Prior Publication Data

US 2013/0256077 A1    Oct. 3, 2013

(51) Int. Cl.
F16D 11/04    (2006.01)
F16D 13/44    (2006.01)

(52) U.S. Cl.
USPC ............ 192/66.31; 192/85.23; 192/89.26

(58) Field of Classification Search
USPC .......... 192/57, 66.3–66.32, 70, 85.05, 85.07, 192/85.08, 85.17, 85.19, 85.23, 85.37, 192/85.57, 89.2, 89.26; 188/71.4, 170
See application file for complete search history.

(56) References Cited

U.S. PATENT DOCUMENTS

| | | | |
|---|---|---|---|
| 2,698,676 A * | 1/1955 | Eason ........................ | 188/170 |
| 4,790,413 A | 12/1988 | Meynier | |
| 4,863,000 A | 9/1989 | Patel | |
| 4,907,683 A * | 3/1990 | Patel ........................ | 192/85.37 |
| 5,010,985 A | 4/1991 | Russell et al. | |
| 5,383,544 A | 1/1995 | Patel | |
| 6,318,511 B1 | 11/2001 | Clement et al. | |
| 6,609,601 B2 | 8/2003 | Vogt | |
| 7,204,356 B2 | 4/2007 | Fox | |
| 7,374,027 B2 | 5/2008 | Mayberry et al. | |
| 7,556,128 B2 | 7/2009 | Mayberry et al. | |
| 7,591,349 B2 | 9/2009 | McConkie et al. | |
| 2008/0110708 A1 | 5/2008 | Mayberry et al. | |
| 2008/0185239 A1 | 8/2008 | Hakon et al. | |
| 2009/0133974 A1 | 5/2009 | Mayberry et al. | |
| 2010/0018831 A1 | 1/2010 | Szpak | |

FOREIGN PATENT DOCUMENTS

DE    19900338 A1    8/1999

OTHER PUBLICATIONS

Double Disc, double performance, Feb. 3, 2007.
Industrial Clutch, The Power of Experience, Clutches, Brakes, Controls & Hydraulics, 2001.
Airflex DBA, DBB, DBBS, and DC Descriptions, 1997.
European Patent Office; International Search Report and Written Opinion issued in corresponding International Application No. PCT/US2013/034137. Date of Mailing: Aug. 1, 2013.

* cited by examiner

Primary Examiner — Jacob S Scott
(74) Attorney, Agent, or Firm — Dykema Gossett PLLC

(57) ABSTRACT

A brake assembly includes a mounting flange having a central opening to receive a shaft, a rotor disc mounted on the shaft and rotatable with the shaft, a float plate having a first friction surface engageable with one face of the rotor disc, and a pressure plate having a second friction surface engageable with another face of the rotor disc. The brake assembly also includes a spring housing, which operates as a piston, and a cylinder coupled to the spring housing to form a fluid pressure chamber. The spring housing moves in a first direction when pressurized fluid enters the fluid pressure chamber and in a second direction when pressurized fluid exits the fluid pressure chamber. The assembly further includes at least one sliding stud to allow axial movement of at least one of the float plate, the pressure plate, and the spring housing to allow axial movement.

16 Claims, 5 Drawing Sheets

FLOATING HOUSING FORCE TRANSMITTING ASSEMBLY

TECHNICAL FIELD

The present teachings relate to a force transmitting assembly, such as a brake or a clutch, and more particularly to such an assembly with floating components.

BACKGROUND

The term "assembly" as used in this disclosure refers to an assembly, such as a brake assembly, that can function as a brake, a clutch, and/or both. While the assembly described herein is particularly suited for use as a brake assembly and will be discussed primarily in the braking context, those of ordinary skill in the art will understand that the assembly is equally capable of functioning as a clutch. For simplicity, the term "assembly" will primarily be used, but the term "assembly," "force transmitting assembly," "brake assembly," and "clutch assembly" are all interchangeable in the description below.

Known force transmitting assemblies have been connected with a shaft to control power transmission. These known assemblies have been used in various applications, such as draglines, power shovels, conveyors, shears, power presses, and other machines.

Typical assemblies include one or more rotor discs that rotate on a shaft. Braking occurs when friction linings attached to plates on either side of the rotor disc clamp down onto the rotor disc. The engagement between the rotor disc faces and the friction linings creates braking action, slowing and eventually stopping rotation of the rotor disc. Pressure may be applied using a spring set within the assembly. These assemblies attach the rotor disc and shaft together via a splined coupling to allow axial movement of the rotor disc during an engagement operation. However, splined couplings experience high wear, regardless of how often it is engaged, from the continuous forces applied to the splines.

There is a desire for an assembly that minimizes wear within the assembly without sacrificing performance.

SUMMARY

A force transmitting assembly includes a mounting flange having a central opening to receive a shaft, wherein the mounting flange is mountable on a frame, a rotor disc mounted on the shaft and rotatable with the shaft, the rotor disc having a first planar face and a second planar face, a float plate having a first friction surface engageable with the first planar face, and a pressure plate having a second friction surface engageable with the second planar face. The assembly also includes a spring housing, which operates as a piston, and a cylinder coupled to the spring housing to form a fluid pressure chamber, wherein the spring housing moves in a first direction when pressurized fluid enters the fluid pressure chamber and the spring housing moves in a second direction when pressurized fluid exits the fluid pressure chamber. The assembly further includes at least one sliding stud slidingly supporting the float plate, the pressure plate, and the spring housing to allow axial movement of at least one of the float plate, the pressure plate, and the spring housing.

DETAILED DESCRIPTION

Figure 1:
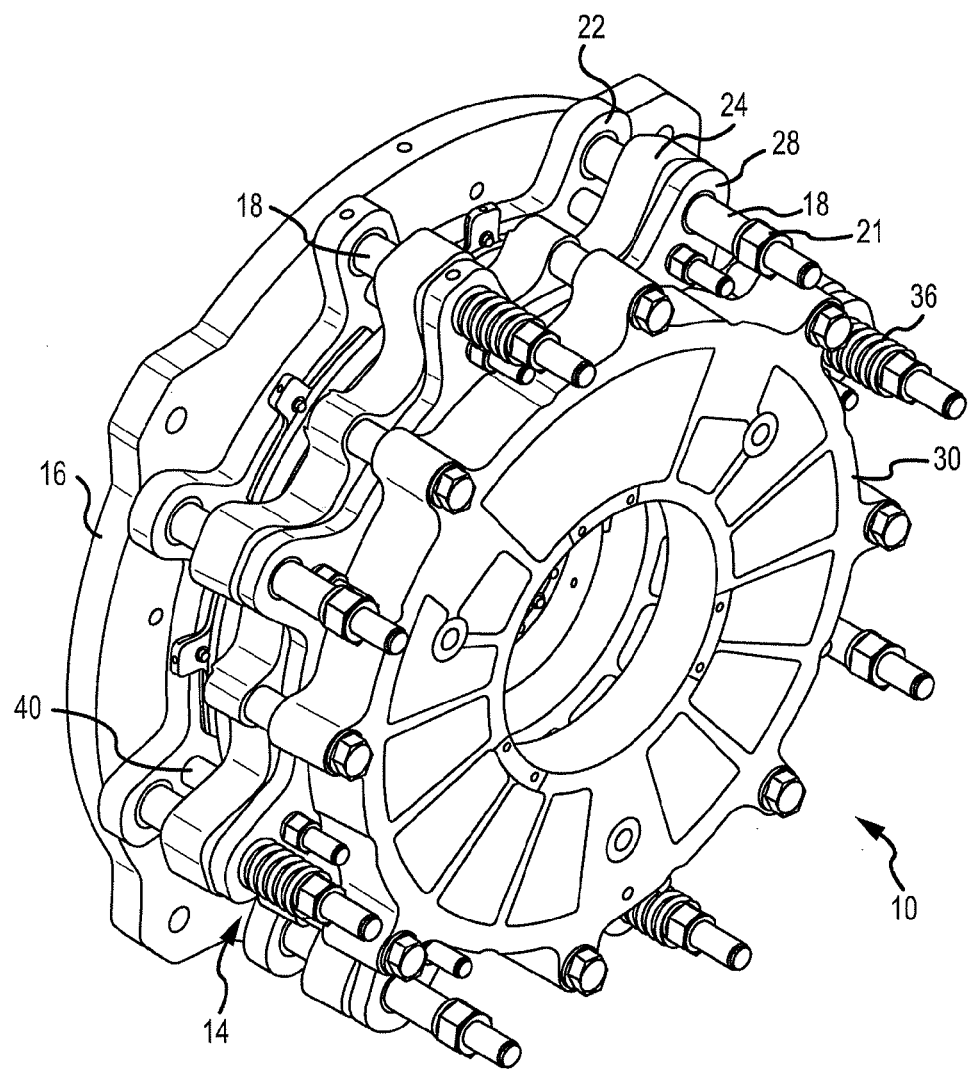
FIG. 1 is a perspective view of a force transmitting assembly according to one aspect of the teachings.

FIGS. 1 through 5 illustrate a force transmitting assembly, such as a brake assembly 10, according to one aspect of the present teachings. The assembly 10 includes a rotor disc 12, which can be driven by a motor (not shown), and a housing 14. The rotor disc 12 may be fixed on a motor shaft 15 in any known manner; in the illustrated example, the motor shaft 15 is a tapered shaft, and the rotor disc 12 is rigidly attached to the motor shaft 15 via a wedge-action coupling 15a.

The housing 14 can include a mounting flange 16 adapted to be mounted on a customer part 17, such as a motor frame (when the assembly 10 is used as a brake) or a driven shaft (when the assembly 10 is used as a clutch). In one aspect of the teachings, the mounting flange 16, as well as other portions of the housing 14, are mounted with a plurality of sliding studs 18 arranged in a circular array. As will be explained in greater detail below, the sliding studs 18 act as rigid supports to guide tubes 20 to guide the axial movement of other components of the housing 14. Nuts 21 may be disposed on the sliding studs 18 to hold the assembly 10 together.

Figure 2:
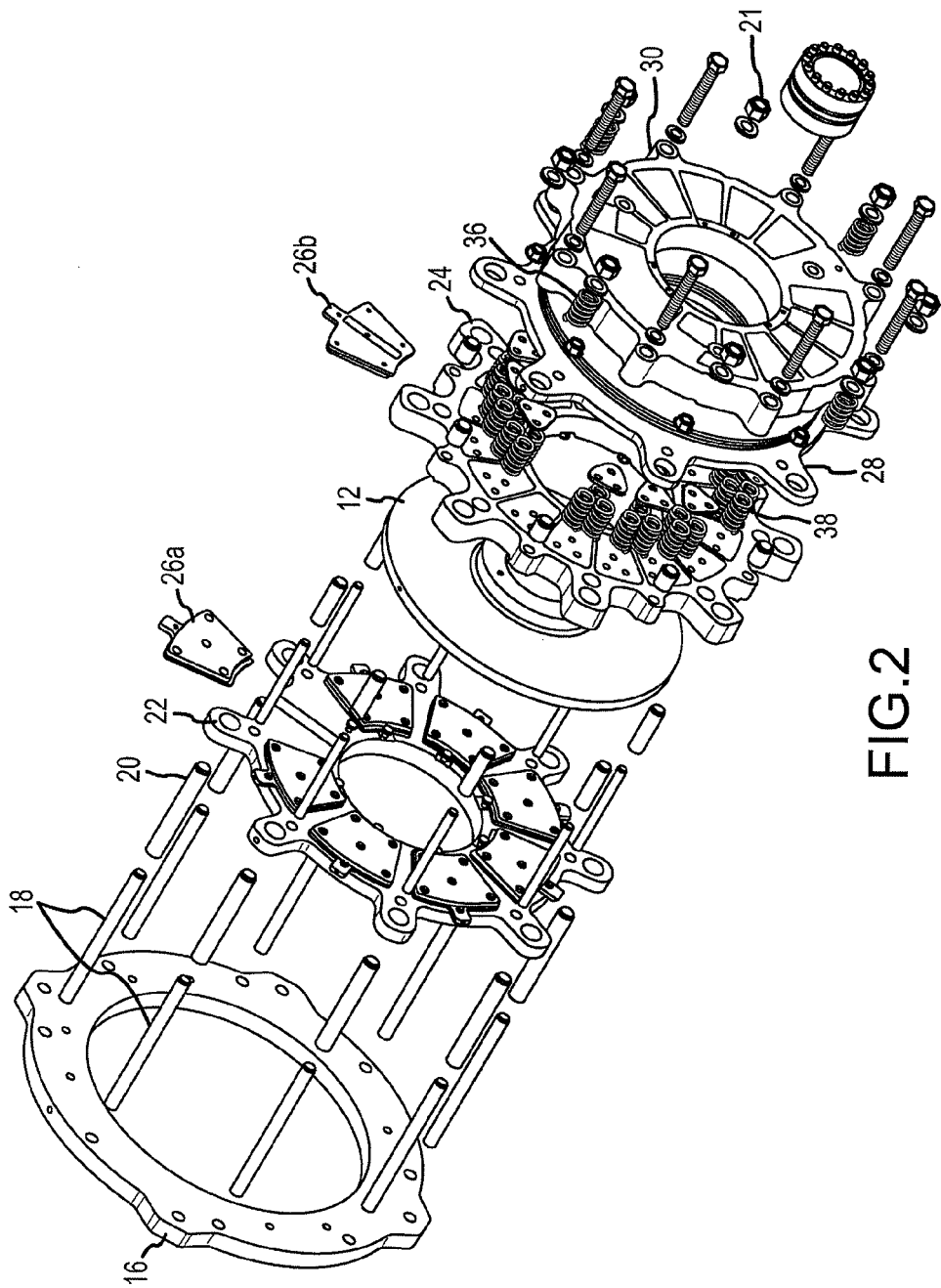
FIG. 2 is an exploded perspective view of the assembly in FIG. 1.

The housing 14 also includes a float plate 22 and a pressure plate 24 disposed on opposite sides of the rotor disc 12. The float plate 22 and pressure plate 24 are both slidingly supported by the sliding studs 18 so they are axially movable on the sliding studs 18. Friction linings 26a, 26b are disposed on the float plate 22 and the pressure plate 24, respectively, on either side of the rotor disc 12. The friction linings 26a, 26b may be made of any appropriate friction material normally used in such assemblies 10. The friction linings 26a, 26b are designed to frictionally engage with the rotor disc 12 to retard rotation of the rotor disc 12. In one aspect of the teachings, the friction linings 26a, 26b may be divided into wedge-shaped segments as shown in FIG. 2 to allow easy removal of the friction linings 26a, 26b without disassembling the entire assembly 10.

The assembly 10 can include a spring housing 28 and a cylinder 30. The spring housing 28 cooperates with the cylinder 30 and operates as a piston. The spring housing 28 and the cylinder 30 together form a fluid chamber 32 with a port (not shown) that allows fluid, such as air or hydraulic fluid, to enter and exit the fluid chamber 32. A bolt 35 may connect the cylinder 30 to the pressure plate 24 so that there is no relative movement between the cylinder 30 and the pressure plate 24. The sliding studs 18 create a large bearing area that provides better support to the floating, sliding parts (e.g., the float plate 22, pressure plate 24, and spring housing 28) than previous assembly designs.

A release spring 36 can be disposed between the nut 21 and the spring housing 28 to bias the float plate 22 and pressure plate 24 apart from each other when the assembly 10 is in a released position. One or more seals 37 may be disposed on the spring housing 28 to form a fluid-tight seal between the spring housing 28 and the cylinder 30. A plurality of compression springs 38 are disposed between the pressure plate 24 and the spring housing 28 to bias the pressure plate 24 and spring housing 28 away from each other.

Support studs 40 provides a rigid connection between the float plate 22 and the spring housing 28 to ensure that the float plate 22 and the spring housing 28 do not move relative to one another. As a result, the float plate 22 and the spring housing 28 move together as a single unit. The support studs 40 may be attached to the float plate 22 and the spring housing 28 via any known means, such as bolts.

The release spring 36 is biased to push the float plate 22 away from the rotor disc 12 during a release operation. More particularly, when the release spring 36 pushes against the spring housing 28 toward the left, the float plate 22 moves to the left away from the rotor disc 12.

Known brake assemblies operate by moving a rotor disc axially during braking action, leaving the housing of the assembly stationary. The assembly 10 shown in FIGS. 1 through 5 operates in a different manner by keeping the rotor disc 12 stationary while axially moving the housing 14. This operation will be explained in greater detail below with reference to FIGS. 3 and 4.

Figure 3:
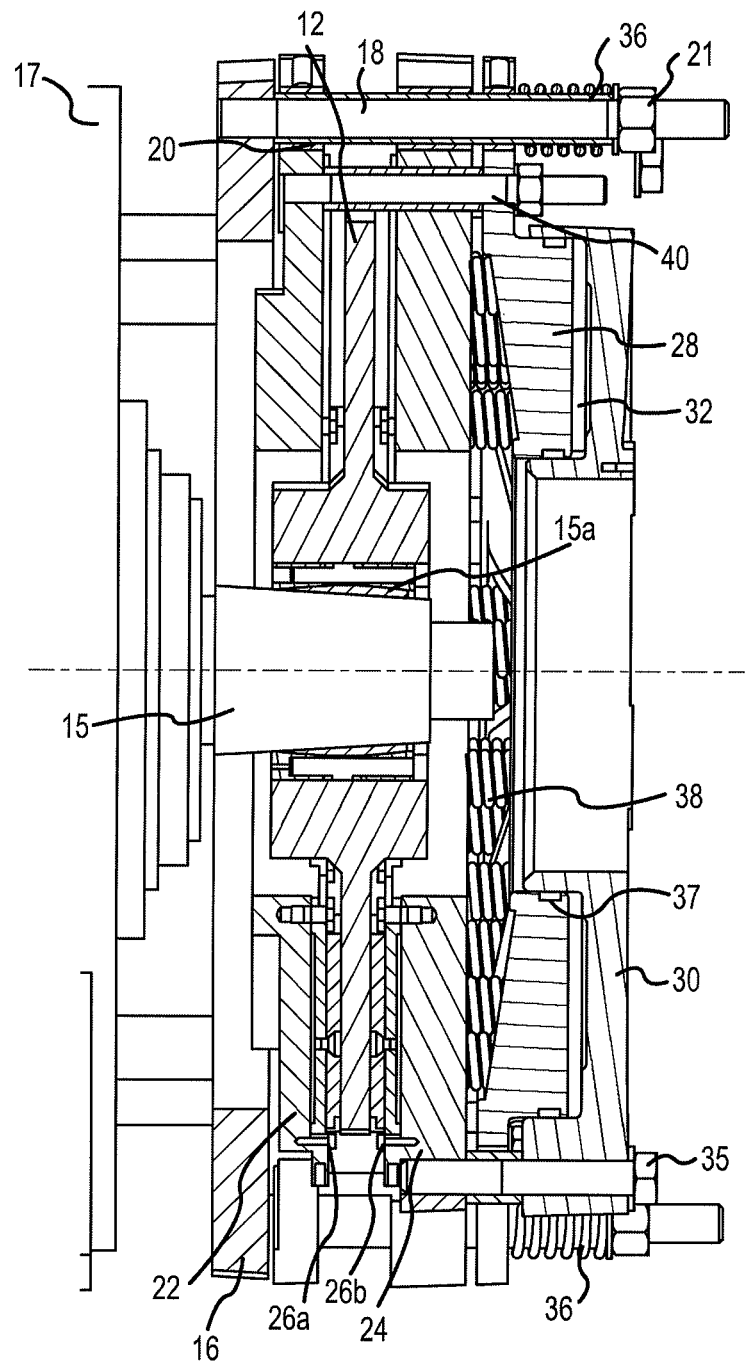
FIG. 3 is a schematic view of a portion of the assembly of FIG. 1 in an engaged condition.
Figure 5:
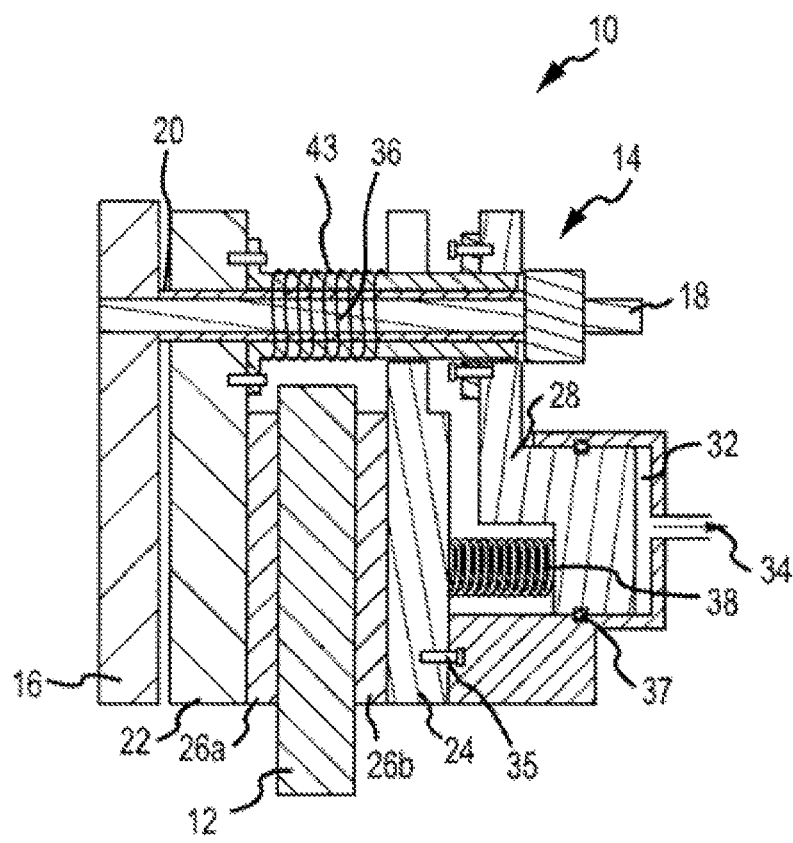
FIG. 5 is a schematic view of a portion of an alternative embodiment of an assembly in an engaged condition.

FIG. 3 shows the assembly 10 in an engaged condition. In this condition, fluid is released from the fluid chamber 32 through a port 34 in the cylinder 30, which is generally shown in FIG. 5. The lack of fluid pressure in the fluid chamber 32 allows the compression springs 38 to overcome the biasing force of the release springs 36. As a result, the compression springs 38 force the pressure plate 24 to the left and the spring housing 28 to the right. The pressure plate 24 movement causes its associated friction lining 26b to contact the right face of the rotor disc 12 to generate braking action.

At the same time, the movement of the spring housing 28 toward the right pulls the float plate 22 toward the right as well because the float plate 22 and spring housing 28 are rigidly connected together. The float plate 22 continues to move toward the right until its associated friction lining 26a contacts the left face of the rotor disc 12 to generate braking action. The combined braking action from the friction linings 26a, 26b on the rotor disc 12 slow and eventually stop rotation of the rotor disc 12. Note that during this entire braking process, the rotor disc 12 remains axially stationary; only the housing 14 components move axially to generate the braking action.

Figure 4:
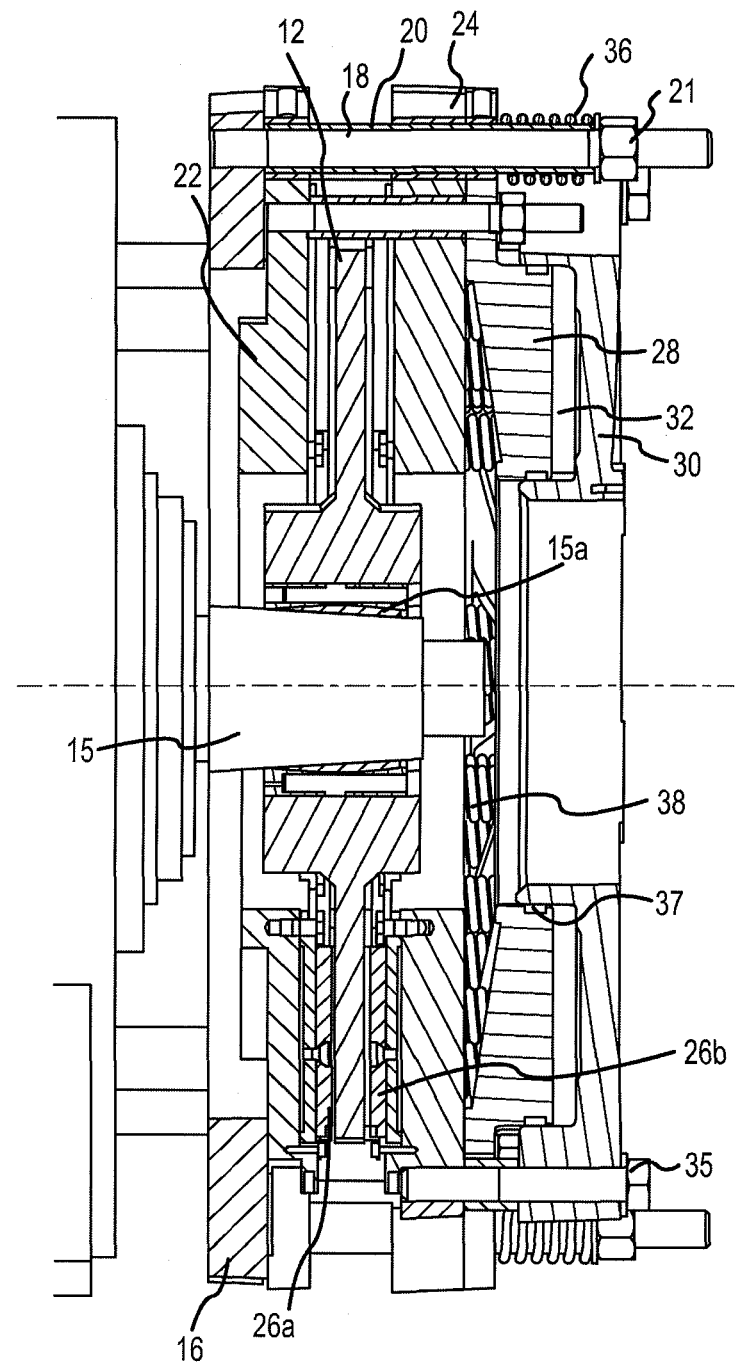
FIG. 4 is a schematic view of a portion of the assembly of FIG. 1 in a released condition.

FIG. 4 shows the assembly 10 in a released condition. To release the assembly 10, pressurized fluid enters the fluid chamber 32. The fluid pressure pushes the cylinder 30 to the right, pulling the pressure plate 24 to the right as well due to the rigid attachment of the cylinder 30 to the pressure plate 24. Moving the pressure plate 24 to the right compresses the compression springs 38 and detaches the friction lining 26b on the pressure plate 24 from the right face of the rotor disc 12.

At the same time, the pressurized fluid in the fluid chamber 32 forces the spring housing 28 to move the left. Since the spring housing 28 is rigidly attached to the float plate 22 by the support studs 40, the float plate 22 to the left as well, which causes its associated friction lining 26b to detach from the left face of the rotor disc 12. The biasing force of the release spring 36 also applies pressure to the spring housing 28, further forcing the float plate 22 to the left, ensuring that the friction linings 26a, 26b do not touch the rotor disc 12 in the released condition. This leaves the rotor disc 12 free to rotate unencumbered.

Note that in the release condition shown in FIG. 4, the float plate 22 movement is controlled by both the fluid pressure in the fluid chamber 32 and the biasing force from the release spring 36, while the pressure plate 24 movement is controlled solely by the fluid pressure in the fluid chamber 32. This is because the combined weight of the float plate 22, the spring housing 28, and the compression springs 38 is significantly greater than the combined weight of the cylinder 30 and the pressure plate 24. Thus, more force is needed to move the float plate 22 (and the other components attached to it) than the pressure plate 24 during the release condition. The biasing force of the release spring 36 supplements the fluid force from the fluid chamber 32 to move the float plate 22, while the pressure plate 24 is moved via fluid force alone. Accommodating for these different weights via the release spring 36 allows the float plate 22 and the pressure plate 24 to separate from the rotor disc 12 at roughly the same rate.

By axially moving the housing 14 instead of the rotor disc 12 during engagement and disengagement, the brake assembly 10 described above provides a more durable and robust structure. Keeping the rotor disc 12 stationary in turn keeps the friction linings 26a, 26b stationary, reducing rotational inertia in the assembly 10 and eliminating the possibility of the linings 26a, 26b flying off the rotor disc 12.

FIG. 5 shows an alternative configuration where a sleeve 43 disposed around the sliding stud 18 is used in place of the support stud 40 to rigidly connect the float plate 22 and the spring housing 28. In this configuration, the release spring 36 may be disposed around each sleeve 43 to bias the float plate 22 and the pressure plate 24 away from each other during a release condition. Note that the assembly 10 may also combine the structures shown in FIGS. 3 and 5 by placing release springs 36 between the float plate 22 and pressure plate 24 and between the spring housing 28 and the nut 21.

Note that although the illustrated aspect shows a single rotor disc design, the assembly 10 can be modified to include additional rotor discs 12 without departing from the scope of the teachings. Moreover, although the illustrated aspect is described with respect to a braking operation, the assembly 10 can be used as a clutch without departing from the scope of the teachings.

It will be appreciated that the above teachings are merely exemplary in nature and is not intended to limit the present teachings, their application or uses. While specific examples have been described in the specification and illustrated in the drawings, it will be understood by those of ordinary skill in the art that various changes may be made and equivalents may be substituted for elements thereof without departing from the scope of the present teachings as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A force transmitting assembly, comprising:
   a mounting flange having a central opening to receive a shaft, wherein the mounting flange is mountable on a frame;
   a rotor disc mounted on the shaft and rotatable with the shaft, the rotor disc having a first planar face and a second planar face;

a float plate having a first friction surface engageable with the first planar face;

a pressure plate having a second friction surface engageable with the second planar face;

a spring housing;

a cylinder coupled to the spring housing to form a fluid pressure chamber, wherein the spring housing acts as a piston, wherein the spring housing moves in a first direction when pressurized fluid enters the fluid pressure chamber and the spring housing moves in a second direction when pressurized fluid exits the fluid pressure chamber;

a plurality of sliding studs slidingly supporting the float plate, the pressure plate, and the spring housing to allow axial movement of at least one of the float plate, the pressure plate, and the spring housing;

a plurality of release springs disposed on the plurality of sliding studs; and a plurality of nuts disposed on the plurality of sliding studs, wherein each release spring is disposed between one of the plurality of nuts and the spring housing to bias the spring housing away from the nut.

2. The assembly of claim 1, wherein the rotor disc is axially stationary.

3. The assembly of claim 1, wherein at least one of the first and second friction surfaces comprises a friction material divided into a plurality of segments.

4. The assembly of claim 1, wherein the float plate is attached to the spring housing to prevent relative axial movement between the float plate and the spring housing.

5. The assembly of claim 4, further comprising at least one support stud attaching the float plate to the spring housing to prevent relative axial movement between the float plate and the spring housing.

6. The assembly of claim 4, further comprising a plurality of sleeves disposed on the plurality of sliding studs, wherein the sleeve attaches the float plate to the spring housing and prevent relative axial movement between the float plate and the spring housing.

7. The assembly of claim 1, wherein the pressure plate is attached to the cylinder to prevent relative axial movement between the pressure plate and the cylinder.

8. The assembly of claim 1, further comprising a plurality of compression springs disposed between the pressure plate and the spring housing, wherein the plurality of compression springs bias the pressure plate away from the spring housing.

9. The assembly of claim 1, wherein the plurality of release springs bias the float plate away from the rotor disc to a released position.

10. The assembly of claim 9,
wherein each release spring is disposed between one of the plurality of nuts and the spring housing to bias the float plate, but not the pressure plate, away from the rotor disc.

11. The assembly of claim 1, further comprising a second plurality of release springs disposed between the float plate and the pressure plate, wherein the second plurality of relaease springs bias the float plate away from the pressure plate.

12. A force transmitting assembly, comprising:

a mounting flange having a central opening to receive a shaft, wherein the mounting flange is mountable on a frame;

a rotor disc mounted on the shaft and rotatable with the shaft, the rotor disc having a first planar face and a second planar face and being stationary in the axial direction;

a float plate having a first friction surface engageable with the first planar face;

a plurality of release springs that bias at least one of the float plate and the pressure plate to a released position;

a pressure plate having a second friction surface engageable with the second planar face;

a spring housing, wherein the float plate is attached to the spring housing to prevent relative axial movement between the float plate and the spring housing;

a plurality of compression springs disposed between the pressure plate and the spring housing, wherein the plurality of compression springs bias the pressure plate away from the spring housing;

a cylinder coupled to the spring housing to form a fluid pressure chamber, wherein the spring housing moves in a first direction when pressurized fluid enters the fluid pressure chamber and the spring housing moves in a second direction when pressurized fluid exits the fluid pressure chamber, wherein the pressure plate is attached to the cylinder to prevent relative axial movement between the pressure plate and the cylinder;

a plurality of sliding studs slidingly supporting the float plate, the pressure plate, and the spring housing to allow axial movement of at least one of the float plate, the pressure plate, and the spring housing; and a plurality of nuts disposed on the plurality of sliding studs, wherein each release spring is disposed between one of the plurality of nuts and the spring housing to bias the spring housing away from the nut.

13. The assembly of claim 12, wherein at least one of the first and second friction surfaces comprises a friction material divided into a plurality of segments.

14. The assembly of claim 12, further comprising at least one support stud attaching the float plate to the spring housing to prevent relative axial movement.

15. The assembly of claim 12, further comprising at least one sleeve disposed on at least one of the plurality of studs, wherein the at least one sleeve attaches the float plate to the spring housing and prevents relative axial movement.

16. The assembly of claim 12, wherein each release spring is disposed between one of the plurality of nuts and the spring housing to bias the float plate, but not the pressure plate, away from the rotor disc.

* * * * *

UNITED STATES PATENT AND TRADEMARK OFFICE
CERTIFICATE OF CORRECTION

| | | |
|---|---|---|
| PATENT NO. | : 8,919,514 B2 | Page 1 of 1 |
| APPLICATION NO. | : 13/432753 | |
| DATED | : December 30, 2014 | |
| INVENTOR(S) | : Shantaram Ashok More | |

It is certified that error appears in the above-identified patent and that said Letters Patent is hereby corrected as shown below:

In The Claims

COLUMN 5, line 37 (Claim 6, line 3) "sleeve attaches" should be -- sleeves attach --.

COLUMN 6, lines 1-2 (Claim 11, lines 3-4) "relaease" should be -- release --.

Signed and Sealed this
Fifth Day of May, 2015

Michelle K. Lee
*Director of the United States Patent and Trademark Office*